United States Patent
Palet

(10) Patent No.: US 10,463,895 B2
(45) Date of Patent: *Nov. 5, 2019

(54) PERSONAL SAFETY APPARATUS AND SYSTEM

(71) Applicant: Fall-Botics, LLC, Florence, WI (US)

(72) Inventor: Timothy James Palet, Cleveland, WI (US)

(73) Assignee: Fall-Botics, LLC, Florence, WI (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/450,757

(22) Filed: Mar. 6, 2017

(65) Prior Publication Data

US 2017/0225018 A1 Aug. 10, 2017

Related U.S. Application Data

(63) Continuation of application No. 14/314,923, filed on Jun. 25, 2014, now Pat. No. 9,623,270.

(51) Int. Cl.
| | |
|---|---|
| *E04G 1/18* | (2006.01) |
| *A62B 35/00* | (2006.01) |
| *E04G 21/32* | (2006.01) |
| *F16M 11/20* | (2006.01) |
| *F16M 11/26* | (2006.01) |
| *F16M 11/38* | (2006.01) |

(52) U.S. Cl.
CPC ...... *A62B 35/0068* (2013.01); *E04G 21/3204* (2013.01); *F16M 11/2021* (2013.01); *F16M 11/26* (2013.01); *F16M 11/38* (2013.01); *F16M 2200/041* (2013.01); *F16M 2200/068* (2013.01)

(58) Field of Classification Search
CPC ............ A62B 35/0068; E04G 21/3204; F16M 11/38; F16M 11/26; F16M 11/2011; F16M 2200/068; F16M 2200/041
See application file for complete search history.

(56) References Cited

U.S. PATENT DOCUMENTS

| | | |
|---|---|---|
| 4,511,015 A | 4/1985 | Purdy |
| 4,607,724 A | 8/1986 | Hillberg |
| 5,307,898 A | 5/1994 | Purdy |
| 5,645,180 A | 7/1997 | Zaguroli, Jr. |
| 6,378,652 B1 | 4/2002 | Albert |

(Continued)

OTHER PUBLICATIONS

Capital Safety, The Ultimate in Fall Protection Full Line Catalog, dated 2012.

(Continued)

*Primary Examiner* — Jerry E Redman
(74) *Attorney, Agent, or Firm* — Andrus Intellectual Property Law, LLP

(57) ABSTRACT

A personal safety apparatus and systems include a mast connected to a base. The mast includes a plurality of mast sections and is vertically extendable from the base between a collapsed position and an extended position. A jib is rotatably connected to the mast. The jib is moveable between a first position wherein the jib is generally parallel to the mast and a second position wherein the jib extends outward from the mast. The jib includes a first jib arm and a second jib arm. The second jib arm is moveable relative to the first jib arm. An anchor point is secured to the jib. The anchor point is configured to connect to a cable configured to secure to a person.

20 Claims, 10 Drawing Sheets

(56) References Cited

U.S. PATENT DOCUMENTS

| | | | |
|---|---|---|---|
| 7,828,116 B2 | 11/2010 | Vetesnik | |
| 8,925,679 B2 | 1/2015 | Vetesnik | |
| 9,623,270 B2* | 4/2017 | Palet | A62B 35/0068 |
| 2002/0121577 A1* | 9/2002 | Metelski | F16M 11/08 |
| | | | 248/123.11 |
| 2004/0195041 A1 | 10/2004 | Vetesnik | |
| 2005/0034920 A1 | 2/2005 | Anderson | |
| 2005/0169735 A1 | 8/2005 | Pelsue | |
| 2006/0208240 A1* | 9/2006 | Spittle | B66C 23/48 |
| | | | 254/8 B |
| 2008/0002967 A1* | 1/2008 | Chapman | B66F 11/048 |
| | | | 396/428 |
| 2010/0126801 A1 | 5/2010 | Begin | |
| 2011/0033293 A1 | 2/2011 | Cavalieri | |
| 2012/0138386 A1 | 6/2012 | Robitaille | |
| 2012/0193165 A1 | 8/2012 | Vetesnik | |
| 2013/0240683 A1 | 9/2013 | Fusy | |
| 2013/0284688 A1 | 10/2013 | Narcisco | |
| 2013/0313396 A1* | 11/2013 | Vetesnik | E04H 12/2269 |
| | | | 248/523 |
| 2014/0076659 A1 | 3/2014 | Terry | |
| 2014/0090927 A1 | 4/2014 | Patton | |
| 2015/0375020 A1* | 12/2015 | Palet | A62B 35/0068 |
| | | | 248/542 |
| 2016/0271430 A1* | 9/2016 | Baughman | A62B 35/0068 |
| 2016/0376806 A1* | 12/2016 | Vetesnik | F16M 11/42 |
| | | | 52/121 |
| 2017/0247236 A1* | 8/2017 | Svoboda | B66D 1/60 |
| 2017/0370114 A1* | 12/2017 | Kornijenko | E04G 21/3276 |
| 2018/0142834 A1* | 5/2018 | Cuttill | E04G 21/3204 |

OTHER PUBLICATIONS

Capital Safety, The Ultimate in Fall Protection Product Catalog, dated 2013.
Capital Safety, The Ultimate in Fall Protection Product Catalog, dated 2014.
Gorbel Free Standing Articulating Jib Crane Manual, dated 2009.
Gorbel Introduction to Jib Cranes Manual, dated 2012.
Gorbel Tether Track, Free Standing Cantilever Rigid Rail Anchor Systems Manual, dated 2012.
Gorbel Tether Track, Fold Away Systems Manual, dated 2012.
Gorbel TSJ50, Tool Solutions Manual, dated 2012.
Gorbel Free Standing Jib Crane Manual, dated 2013.
Gorbel Tether Track, Ceiling Mounted Rigid Rail Anchor Systems Manual, dated 2013.
Gorbel Mast Type Jib Crane Manual, dated 2014.
Rigid Lifelines, Fall Protection Solutions Catalog, 2014.
Tuff Built Products, Inc., Sky-X-Stand Hitch Mount Anchor Points, dated Jan. 27, 2011.
Tuff Built Products, Inc. Catalog, dated Oct. 2012.
Tuff Built Products, Inc., Sky-X-Stand Pro-7, dated Nov. 22, 2012.
Tuff Built Products, Inc., Sky-X-Stands Single Anchor Point Counterweight Trailer System, dated Dec. 11, 2012.

* cited by examiner

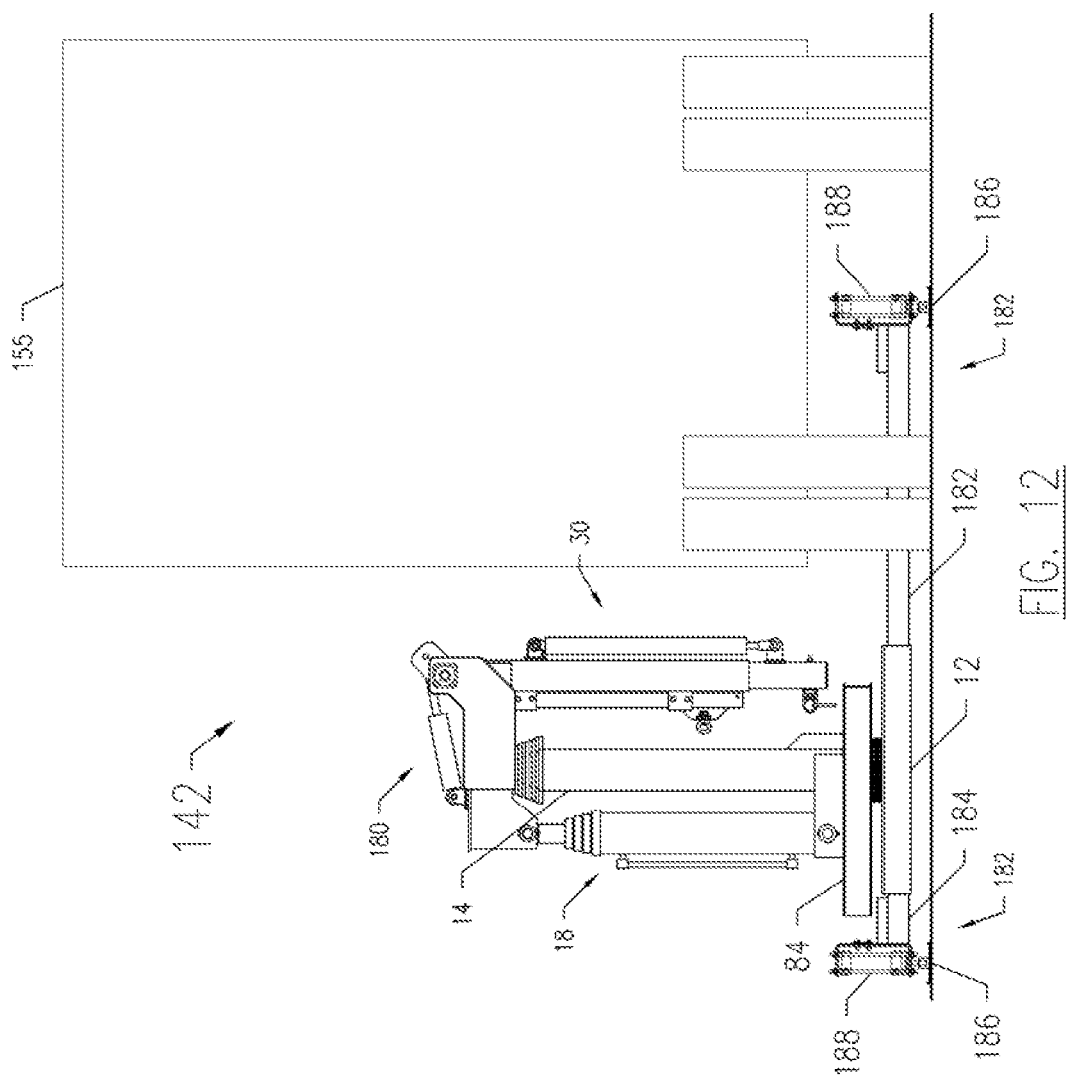

PERSONAL SAFETY APPARATUS AND SYSTEM

CROSS REFERENCE TO RELATED APPLICATION

This application is continuation of U.S. application Ser. No. 14/314,923, filed Jun. 25, 2014, which application was published on Dec. 31, 2015, as U.S. Publication No. U.S. US2015/0375020, which application is incorporated herein by reference.

BACKGROUND

The present disclosure is related to the field of personal safety. More specifically, the present disclosure relates to systems and apparatus for personal fall protection.

In construction and other maintenance and manufacturing industries, falls are a significant cause of work fatalities and injuries. The U.S. Department of Labors' Occupational Safety and Health Administration (OSHA) specifies that individuals required to comply with OSHA General Industry Regulations, 29 CFR 1910, be protected from falls when the workers' feet exceed four feet or higher from the walking and/or working surface. OSHA further specifies that any worker required to comply with OSHA Construction Regulations, 29 CFR 1926 Subpart M, be protected from falls when the workers' feet exceed six feet or higher from the walking and/or working surfaces. Other trade specific heights also apply to specific tasks such as scaffolding, wherein a worker needs to be protected after a working surface height of ten feet.

There are three types of fall protection solutions available which are administrative, engineering, and Personal Protective Equipment (PPE). An example of an administrative control would be a written fall protection plan that addresses the fall hazards and provides training to reduce these fall hazards. An example of an engineering control would be providing guard rails around openings in elevated floors or roof perimeters. Another example of an engineering control would be installing an electric solenoid valve so a worker does not have to climb to an elevated work surface to reach a remote valve therefore eliminating the fall hazard by design. If administrate and engineering controls are not effective at controlling or removing the fall hazards, then fall protection systems are used.

Fall protection systems are designed to either restrain a fall, prevent a fall, or arrest a fall. In settings where the worker can actually fall from the work surface, the worker may use a Personal Fall Arrest System (PFAS). An example of a restraint PFAS may include a full body harness attached to a lifeline where the worker is restrained from the leading edge of a roof and cannot fall. Safety nets are another example of a fall arrest system. Other fall arrest systems may include ropes, wires, or chains and supporting stanchions that are erected along building structural members, along an edge of an elevated work area or overhead that are designed to arrest a fall. Personal fall arrest systems (PFAS) include an anchorage, connector or connecting device and a full body harness. Positioning device systems include an anchorage and full body harness that is arranged such that the worker can only free fall a predetermined distance from the elevated work surface. When no other alternative fall protection is available in construction, a safety monitoring system may be used in which a competent person is appointed to monitor the safety of workers working at the elevated worksite.

Currently available safety net systems, positioning device systems, and PFAS are limited in that such systems are difficult or time consuming to set up or establish relative to an elevated work surface. Additionally, an engineer shall approve or design anchorage at each location to which a fall protection is connected to insure the anchor will withstand the impact load generated during a fall arresting leading to large engineering costs. In many industrial settings, overhead cranes must be able to pass where the worker is completing a task at heights thus eliminating the possibility of connecting to an overhead building structure. Systems have been developed to accommodate this scenario; however, current systems are bulky in stowage, difficult to adjust to changing worksite locations or conditions, and limited on material handling capabilities while simultaneously also protecting a worker as a fall arrest device. Additionally, many currently available systems are application specific and therefore multiple fall protection systems must be present or available for use at a worksite that contains multiple and/or diverse elevated work surfaces.

BRIEF DISCLOSURE

An exemplary embodiment of a personal safety apparatus includes a base. A mast is connected to the base. The mast includes a plurality of mast sections and is vertically extendable from the base between a collapsed position and an extended position. A jib is rotatably connected to the mast and moveable between a first position wherein the jib is generally parallel to the mast and a second position wherein the jib extends outward from the mast. The jib includes a first jib arm and a second jib arm. The first jib arm and the second jib arm are arranged telescopically and the second jib arm is moveable relative to the first jib arm between a first retracted position and a second extended position. An anchor point is secured to the jib. The anchor point is configured to connect to a cable configured to secure to a person.

An exemplary embodiment of a personal safety system includes first and second personal safety apparatus. Each of the first and second personal safety apparatus include a base. The personal safety apparatus further includes a mast connected to the base. The mast includes a plurality of mast sections and is vertically extendable from the base between a collapsed position and an extended position. The first and second personal safety apparatus each include a jib rotatably connected to the mast and moveable between a first position where the jib is generally parallel to the mast and a second position wherein the jib extends outward from the mast. Each jib further includes a first jib arm and a second jib arm. The first jib arm and the second jib arm are arranged telescopically and the second jib arm is movable relative to the first jib arm between a first retracted position and a second extended position. The first and second personal safety apparatus each include an anchor point. The anchor point is configured to connect to a cable configured to secure to a person. The first and second personal safety apparatus each include a user input device that is configured to receive input commands from a user. The first and second personal safety apparatus each include a controlled operably connected to the mast and the jib. On receipt of a user input at a respective user input device, the controller operates the personal safety apparatus between a first configuration and a second configuration. In the first configuration the mast is in the collapsed position, the jib is in the first position, and the second jib arm is in the first retracted position. In the second configuration the mast is in the extended position, the jib is in the second position, and the second jib arm is in the second extended position.

An exemplary embodiment of a personal safety apparatus includes a base. A mast is connected to the base. The mast includes a plurality of telescopically arranged mast sections and is vertically extendable from the base between a collapsed position and an extended position. A hydraulic assembly is connected to the base and to the mast. The hydraulic assembly is operable to move the mast between the collapsed position and the extended position. A jib is rotatingly connected to the mast and to the hydraulic assembly. The jib includes a first jib arm connected to the mast and a second jib arm. The second jib arm is extendably movable relative to the first jib arm. The jib is movable between a first position, wherein the jib is continually parallel to the mast, and a second position, wherein the jib extends outward from the mast. A first hydraulic cylinder is connected between the mast and the jib. The first hydraulic cylinder operates to move the jib from the first position to the second position. A second hydraulic cylinder is connected between the first jib arm and the second jib arm. The second hydraulic cylinder is operable to move the second jib arm between a first retracted position and a second extended position. A safety cable is connected to the jib at an anchor point.

BRIEF DESCRIPTION OF THE DRAWINGS

FIG. 12 depicts another exemplary alternative embodiment of a personal safety apparatus in a retracted configuration.

DETAILED DISCLOSURE

Figure 1:
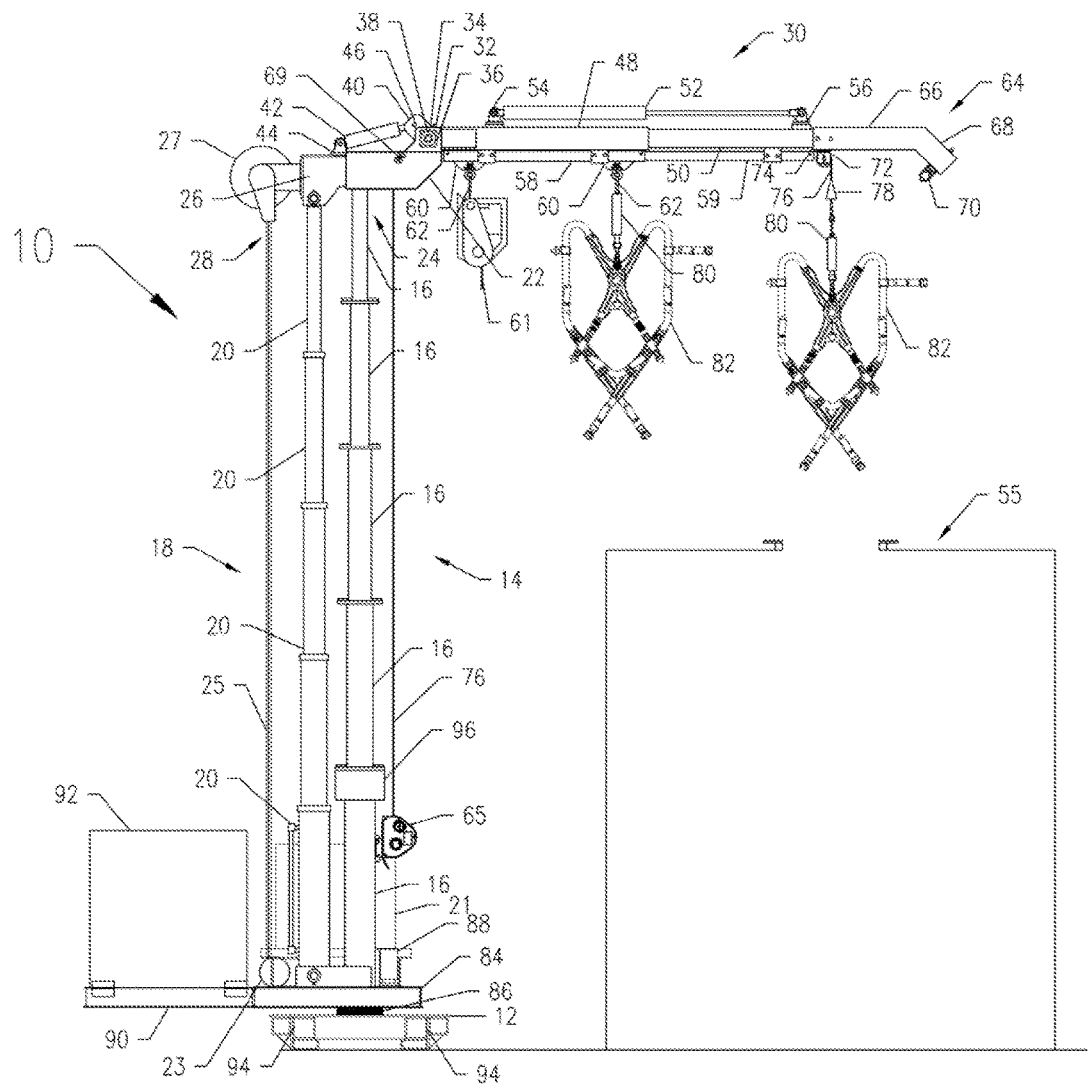
FIG. 1 depicts an exemplary embodiment of a personal safety apparatus in an extended configuration.

FIG. 1 depicts an exemplary embodiment of a personal safety apparatus 10. As described in further detail herein, embodiments of the personal safety apparatus 10 may be used at construction, industrial, maintenance or other worksites wherein a person is working at an elevated location and therefore subject to an increased risk for injury or harm due to a fall from the elevated worksite. The personal safety apparatus includes a base 12. A mast 14 is secured to the base 12. In an exemplary embodiment, the mast 14 includes a plurality of telescoping mast sections 16. However, it will be recognized that in alternative embodiments, other mast configurations and/or implementations may be used while remaining within the scope of the present disclosure. In an exemplary embodiment, the mast sections 16 are nestingly dimensioned square tubing although, it is recognized that other configurations, including but not limited to round tubing or adjacent rods or solid sections may be used. It will be recognized that in exemplary embodiments, the mast sections 16 enable the mast 14 to extend between an extended configuration as depicted and described herein with respect to FIG. 1 and a collapsed position, as will be exemplarily described with respect to FIG. 2. However, it will also be recognized that as used herein, the extended position and the collapsed position may be relative terms and the mast 14 may operate at and between extended and collapsed positions within the full range of mast extension.

A hydraulic assembly 18 is secured to the base 12. Similar to exemplary embodiments of the mast 14, the hydraulic assembly 18 may include a plurality of telescoping hydraulic cylinders 20. As will be recognized by a person of ordinary skill in the art, the hydraulic assembly 18 may operate by the introduction or removal of hydraulic fluid into the interior, or passages within the interior, (not depicted) of the hydraulic cylinders 20 to extend or retract the plurality of telescoping hydraulic cylinders 20. As will be recognized by a person of ordinary skill in the art the hydraulic cylinders 20 may be supplied with hydraulic fluid which is exemplarily stored in a tank 21 and directed into and out of the hydraulic cylinder 20 through the operation of one or more pumps 23 and/or valves (not depicted) by a series configured to operate the hydraulic cylinders as disclosed herein. The hydraulic assembly 18 extends in a generally vertical direction and in an orientation generally parallel to the mast 14. While depicted as separate structures in FIG. 1, it is to be recognized that in alternative embodiments, the mast 14 and hydraulic assembly 18 may be interconnected. In a non-limiting example, the hydraulic assembly 18 may be alternatively located coaxially interior to the mast 14.

A mast cap 22 is secured to a top 24 of the mast 14. A cylinder cap 26 is secured to a top end 28 of the hydraulic assembly 18. The mast cap 22 is secured to the cylinder cap 26 in a manner as may be recognized by a person of ordinary skill in the art, including a friction fit or welding such that operation of the hydraulic assembly to extend or retract the hydraulic cylinder 20 of the hydraulic assembly 18 similarly translates the mast sections 16 of the mast 14 in the vertical direction such as to move the mast between the collapsed position and the extended position. While the embodiment of the personal safety apparatus 10 depicted in FIG. 1 depicts separate structures of the mast cap 22 and the cylinder cap 26, it will be recognized by a person of ordinary skill in the art that in additional embodiments, the mast cap 22 and the cylinder cap 26 may be a unitary structure.

A jib 30 is rotatably connected to the mast cap 22 at a secured end 32. It will be recognized that by the structural relationship of the mast cap 22, cylinder cap 26, top end 24 of the mast 14 and the top end 28 of the hydraulic assembly 18 that the jib 30 is similarly rotatably connected to these components as well.

In the exemplary embodiment of the personal safety apparatus 10 as depicted in FIG. 1, the jib 30 is rotatably connected to the mast cap 22 at a pivot 34. The pivot 34 exemplarily includes bearings 36 and a shaft 38 that facilitates rotational movement of the jib 30 relative to the fixed position of the mast cap 22. It will be recognized by a person of ordinary skill in the art that when the mast is not being operated between collapsed or extended positions, or positions therebetween, that the mast cap 22 represents a fixed point in relative dimensional space about which the jib 30 may rotate.

Figure 2:
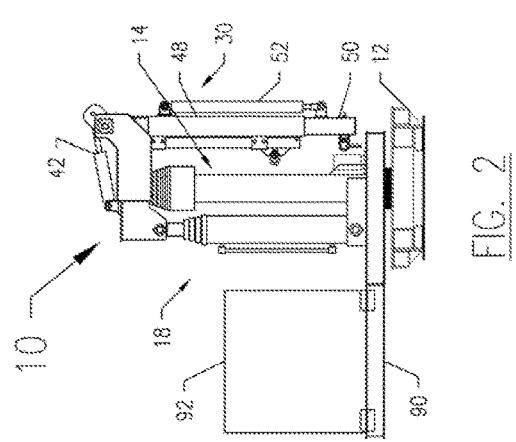
FIG. 2 depicts an exemplary embodiment of the personal safety apparatus in a retracted configuration.
Figure 3:
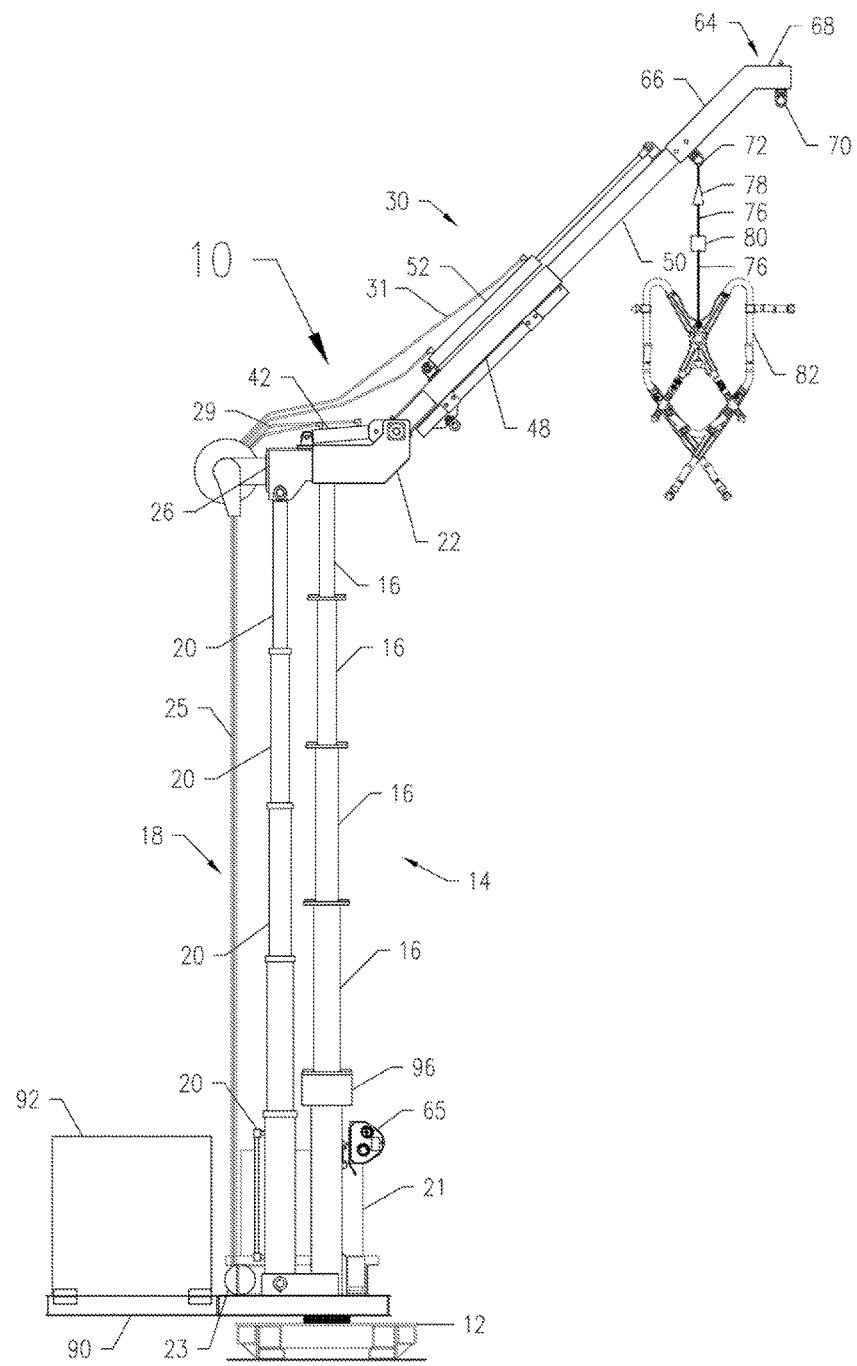
FIG. 3 depicts an exemplary embodiment of the personal safety apparatus with the jib in an additional position.

The jib 30 further includes a jib bracket 40 that extends from the secured end 32. A hydraulic cylinder 42 is pivotably connected between the cylinder cap 26 and the jib bracket 40. Exemplarily, the hydraulic cylinder 42 is connected to the cylinder cap 26 at a pivot 44 and the hydraulic cylinder 42 is connected to the jib bracket 40 at a pivot 46. It will thus be recognized that operation of the hydraulic cylinder 42 between collapsed and extended positions operates to rotate the jib 30 about the pivot 34 and relative to the top end 24 of the mast 14. It will further be recognized that while the hydraulic cylinder 42 is described and depicted in FIG. 1 as being connected by pivot 44 to the cylinder cap 26, that the hydraulic cylinder 42 may similarly be pivotably connected to the mast cap 22, top end 24, or top end 28 with similar effect. In a still further embodiment due to a fixed structural relationship between these components, the hydraulic cylinder 42 may be considered to be pivotably secured relative to all of these components. It will be recognized that FIGS. 1-3 depict the jib 30 rotated to different angles relative to the mast 14. FIG. 1 depicts the jib 30 rotated generally perpendicular to the mast 14, FIG. 2 depicts the jib 30 rotated to be generally parallel to the mast 14. FIG. 3 depicts the jib 30 rotated to an angle obtuse to the mast 14. In an exemplary embodiment, the jib 30 may be approximately 135° apart from the mast 14, although other angles are also contemplated. In an exemplary embodiment, FIGS. 1 and 3 depict an exemplary operable range of jib angulation within which the safety apparatus may be used to fall protection as disclosed herein. While FIG. 2 exemplarily depicts the mast 14 in a storage or transport configuration. It is recognized that these depict merely exemplary relationships between the jib 30 and the mast 14.

The jib 30 exemplarily includes a first jib arm 48 and a second jib arm 50. The first jib arm 48 exemplarily includes the secured end 32 of the jib 30 and the second jib arm 50 is exemplarily arranged telescopically to the first jib arm 48. It will be recognized that in additional embodiments, the first jib arm 48 and the second jib arm 50 are movingly engaged and that the telescopic engagement in the exemplary embodiment of the personal safety apparatus 10 depicted in FIG. 1 is merely exemplary of a possible movable engagement between the second jib arm 50 and the first jib arm 48. The second jib arm 50 is movable with respect to the first jib arm 48 between a first retracted position wherein the second jib arm 50 is generally co-extensive with the first jib arm 48 and an extended position in which the second jib arm 50 extends away from the first jib arm 48. In an exemplary embodiment, the first jib arm 48 and second jib arm 50 are coaxial in arrangement, with the second jib arm 50 movable along this common axis.

A hydraulic cylinder 52 is pivotably secured between the first jib arm 48 and the second jib arm 50. The hydraulic cylinder 52 is exemplarily connected to the first jib arm 48 at pivot 54 and the hydraulic cylinder 52 is exemplarily connected to the second jib arm 50 at pivot 56. As described in further detail herein, operation of the hydraulic cylinder 52 between an extended position and a retracted position similarly moves the second jib arm 50 with respect to the first jib arm 48 between the retracted position and the extended position. FIG. 1 exemplarily depicts the second jib arm 50 in the extended position.

In an exemplary embodiment, at least one hose 25 extends from the hydraulic pump 23 to a hose reel 27 which is exemplarily mounted to the cylinder cap 26. In operation as the mast 14 and hydraulic assembly 18 move between collapsed and extended configurations, the hose 25 is let out from the reel 27 and drawn back into the reel 27 such that the hose 25 generally remains taut and does not interfere with equipment of personnel. Additional hoses 29, 31 (depicted in FIG. 3) extend from the hose reel 27 respectively to the hydraulic cylinders 42, 52 to supply or remove hydraulic fluid therefrom in order to operate the jib as disclosed herein. In another embodiment, separate hose reels 27 are used for each of the hoses to independently control the lengths of the hoses out of the reels 27. In such an embodiment, the hose 25 may supply the hydraulic fluid to a manifold (not depicted) which is controlled or operated to direct hydraulic fluid to the hoses 29, 31 and cylinders 42, 52.

The jib 30 further includes a track 58 secured to an underside of the jib 30, and exemplarily secured to the first jib arm 48; however, the track 58 may be secured to other portions of the jib 30 as well. In an exemplary embodiment, the safety apparatus 10 further includes a telescopic track section 59 secured to the second jib arm 50. The telescopic track section 29 is telescopically movable along with the second jib arm 50, telescopic to the track 58. In an alternative embodiment, the jib arm 50 relative to the track 58 and first jib arm 48. A trolley is slidably or rollably connected to the track 58 and/or track sections 59. An anchor point 62 is connected to the trolley 60 and exemplarily provides a point at which a safety cable 70, harness 82, and other working or safety equipment as described herein may be secured to the personal safety apparatus 60 and subsequently secured to the worker to provide fall protection to the worker as the worker works at an elevated worksite 55, for example and industrial tank. In an exemplarily embodiment as the worker moves towards and away from the mast 14, the worker's position relative to the mast 14 will impart a moving force through the safety cable 76 to the attachment point 62 and trolley 60, resulting in the trolley 60 moving along the track 58 relative to the worker's position.

In exemplary embodiments, a winch 61 is secured to the jib 30. In further exemplary embodiments, the winch 61 may be secured to an anchor point 62 secured to the first jib arm 48, second jib arm 50, or to a trolley 60 that moves along the track 58 and/or track section 59. The winch 61 is operable by a worker to lift and/or hold tools, large components, or machinery to be installed, assembled, operated, or secured at the elevated worksite 55. In exemplary embodiments, the safety apparatus 10 provides persona fall protection safety to the worker, while facilitating material or other equipment handling needs of the worker at the elevated worksite.

In an exemplary embodiment, the jib 30 of the personal safety apparatus 10 further includes a jib arm extension 64 that is secured to the second jib arm and extends away from the second jib arm 50 in a direction generally away from the first jib arm 48. In an exemplary embodiment, the jib arm extension 64 includes a first arm portion 66 and a second arm portion 68. In an exemplary embodiment, the first arm portion 66 of the jib arm extension 64 is coaxial to the second jib arm 50 and the second arm portion 68 is angled relative to the first arm portion 66, as will be described in further detail herein. In an additional exemplary embodiment, the first arm portion is secured to the second jib arm 50 in an angled relationship to the second jib arm 50 and the second arm portion 68 is angled relative to the first arm portion 66 such that the second arm portion 68 is generally parallel to the second jib arm 50. A person of ordinary skill in the art will recognize other relationships between the first arm portion 66, second arm portion 68, and second jib arm 50 that are within the scope of the present disclosure. An extension anchor point 70 is exemplarily secured to the second arm portion 68 and a safety cable (not depicted) exemplarily extends from the extension anchor point 70 to a worker to provide fall protection to the worker. In a still further embodiment, the anchor point 70 on the jib arm extension 64 may be secured to a trolley and/or track (not depicted) as described above. The jib arm extension 64 may further include a pulley or truss as described herein in greater detail herein, or other components adapted for a particular worksite as may be recognized by a person of ordinary skill in the art.

An anchor point 72 is secured to the jib 30, exemplarily at an extension end 74 of the second jib arm 50. As described above with respect to the anchor points 62 and 70, the anchor point 72 is configured to connect to a safety cable which is configured to secure to a person to provide more fall protection as disclosed herein to that person working at an elevated worksite. In an exemplary embodiment, the anchor point 72 is a pulley as will be described in further detail herein. In an exemplary embodiment as disclosed herein, an inclination sensor 78 may be disposed between the anchor point 72 and the safety cable 76. As will be described in further detail herein, the inclination sensor 78 is exemplarily relative position sensor which may include a digital level, a tilt sensor, a gyroscope, or an accelerometer that detects an angulation between the safety cable 76 and the anchor point 72. In an exemplary embodiment, a retraction device 80 is positioned in line with the safety cable 76, or in an alternative embodiment disposed between the level angle indicator and the safety cable 76 such as to retract any slack in the safety cable 76 that extends to the person receiving the fall protection. Thus, the angulation detected by the inclination sensor 78 is representative of a relative position of the person relative to the anchor point 72. In embodiments as disclosed in further detail herein, the inclination sensor 78 is able to transmit this angulation of information exemplarily through wired and/or wireless communication technologies. A harness 82 is exemplarily secured to an end of the safety cable 76 and the person receiving the fall protection is secured to the safety cable 76 by the harness 82.

An exemplary embodiment further includes a mechanical retractor 65, which may exemplarily be secured to the mast 14. The mechanical retractor 65 may exemplarily by operated by an electromagnetic motor, while in an alternative embodiment, the retractor 65 includes a handle 67 for manual operation. The retractor 65 exemplarily maintains a coil of the safety cable 76 which extends therefrom. The safety cable is exemplarily directed through a pulley 69 and extends outward along the jib 30 to the anchor point 72. In operation, the retractor 65 releases ad spools the safety cable 76, to remove or limit slack in the safety cable as the mast 14 or jib 30 are operated, or as the work moves about the elevated worksite 55. Therefore, some embodiments may use one or both of the retractor 65 and retraction device 80 to manage the safety cable 76.

In exemplary embodiments, the mast 14 and the hydraulic assembly 18 are rotatably secured to the base 12. The mast 14 and hydraulic assembly 18 are exemplarily rotatably secured to the base 12 by a turntable 84. A rotating assembly 86 is exemplarily constructed between the turntable 84 and the base 12. In an exemplary embodiment, the rotating assembly 86 is a slewing bearing and pinion. In alternative embodiments, various other rotating assemblies, including those with bearings, shocks, or gears or other mechanical arrangements as will be recognized by a person of ordinary skill in the art may be used. In an exemplary embodiment, a turntable motor 88 operates to rotate the turntable 84 to which the mast 14 and hydraulic assembly 18 are secured, relative to the base 12. In an exemplary embodiment, the turntable 84 further includes one or more counterweight arms 90 that extend away from the turntable 84 in a direction generally opposed to the direction in which the jib 30 extends away from the mast 14. In one embodiment, a counterweight 92 is secured to the at least one counterweight arm 90. The counterweight 92 may exemplarily be a cast block of material such as metal or concrete. In an alternative embodiment, the counterweight arm 90 is configured to receive an onsite counterweight. Such an embodiment may have the advantage of being lighter weight and more readily portable as no counterweight must be moved with the device. Non-limiting examples of onsite counterweights may include concrete, rocks, sand and other construction materials which may be placed in a container which can be secured to a counterweight arm. Another counterweight may include a container such as a barrel of liquid, exemplarily water. In an embodiment, the base 12 may include one or more ports 94 that are exemplarily configured to receive one or more functional arms of a forklift, hand truck or other similar conveying apparatus which may be used by a person to move the personal safety apparatus 10 to a location for use. In still further exemplarily embodiments, the forklift or other conveying apparatus may then be left in engagement with the personal safety apparatus 10 and used as the counterweight.

Figure 10:
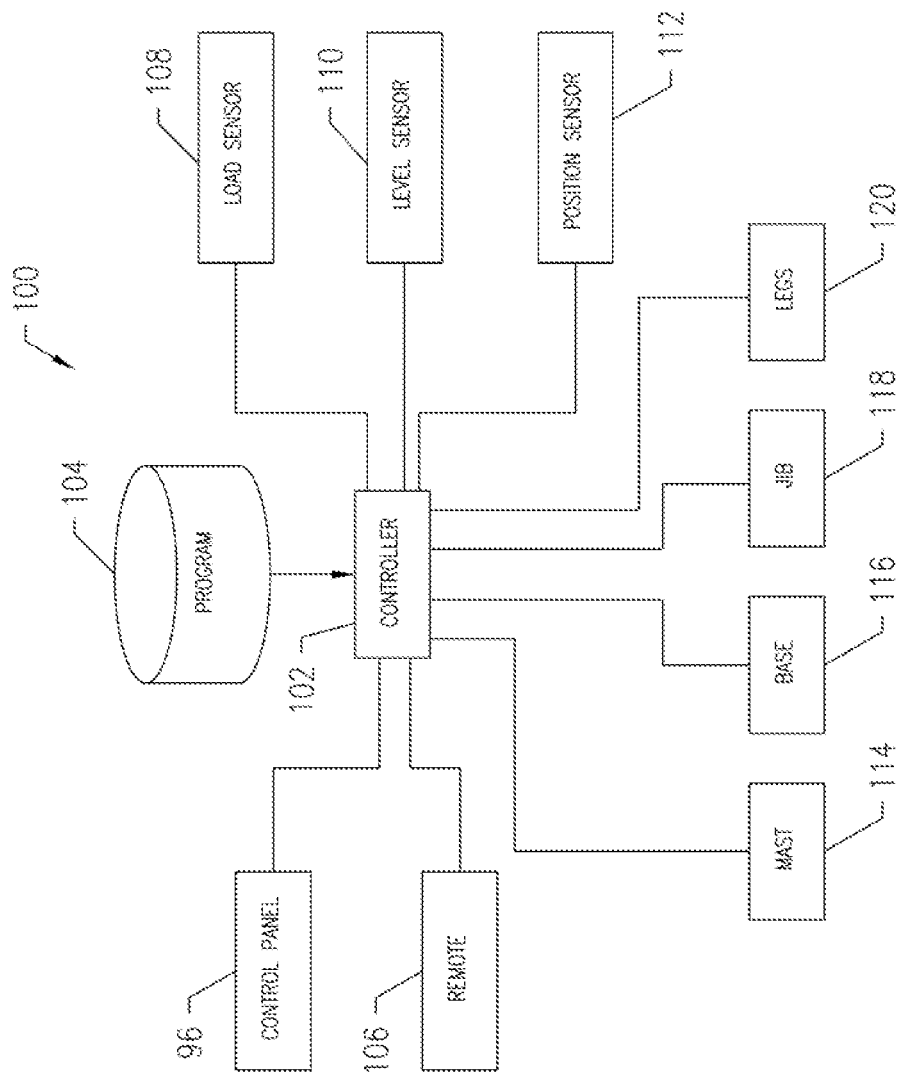
FIG. 10 is a system diagram of an exemplary embodiment of a personal safety apparatus.

Embodiments of the personal safety apparatus 10 further include a control panel 96 and associated controls as will be described in further detail herein. The control panel 96 may exemplarily be a touch screen control panel capable of receiving touch based user inputs. In another embodiment, the control panel 96 may include physical buttons, levers, dials, a joystick or other user input devices capable of receiving controls from an operator. FIG. 10 is a system diagram of an exemplary embodiment of a personal safety apparatus 100 which may exemplarily be configured as the personal safety apparatus 10 depicted in FIG. 1. It will be further recognized that many of the components of the personal safety apparatus 100 are not bodily depicted in other structural depictions and descriptions of embodiments herein, including FIGS. 1-3, although this is only done for clarity purposes. It is recognized that such components may be exemplarily embodied in any disclosed embodiments to carry out the features as described with respect to FIG. 10 in any of the embodiments disclosed herein.

The personal safety apparatus 100 includes a controller 102. The controller 102 can include a microprocessor and other circuitry that retrieves and executes a software or firmware program stored at a computer readable medium 104 that is communicatively connected to the controller 102. In embodiments, the computer readable medium 104 may be an integral part of the controller 102 or may be configured as a separate component. In still further examples, the computer readable media is remotely located to the controller, yet communicatively connected thereto by wired or wireless communicative connections. The controller 102 may be within a single processing device, but can also be distributed across multiple processing devices or sub-systems that cooperate in executing programming instructions. Examples of the controller 102 may include a general purpose central processing unit, applications specific processors, and logic devices, as well as any other type of processing device, combinations of processing devices, or variations thereof.

The controller 102 executes the software or firmware programs from the computer readable medium 104 to carry out and perform the functions as described herein. As previously noted, the control panel 96 includes one or more user input devices whereby an operator can control the operation of the personal safety apparatus. The control inputs received at the control panel 96 are provided to the controller 102. Additionally, or alternatively, embodiments of the personal safety apparatus 100 can include a remote 106. Such a remote 106 may be held by the operator during use of the personal safety apparatus and may be communicatively connected by wired or wireless communicative connections to the controller 102 such that the operator can provide control inputs to the controller 102 at a location apart from the control panel 96. In an exemplary and non-limiting embodiment, the remote 106 may be an app on a smart phone or other portable or mobile computer.

The personal safety apparatus 100 further includes a plurality of sensors that monitor various conditions of the personal safety apparatus and provide indications of the conditions to the controller 102 for further operation. One or more load sensors 108 are disposed on the personal safety apparatus such as to monitor the loads of forces placed at various components. While embodiments of the personal safety apparatus may be designed to effectively operate under expected loads or to meet particular load ratings or standards, the personal safety apparatus may monitor loads imparted on particular structures, including, but not limited to the jib 30 and mast 14. In the event that excessive load is detected, the controller 102 may operate one or more of the components of the personal safety apparatus as described in further detail herein in order to take remedial or corrective action.

As previously described, an inclination sensor 110, as previously described above is connected in association with a safety cable secured to a user of the personal safety device. The inclination sensor 110 provides an indication of a relative direction between the user of the personal safety apparatus and the anchor point on the jib to which the person is secured. The controller 102 uses the information from the inclination sensor 110 as described above, and as will be described in further detail herein, in the exemplary embodiments in which the personal safety apparatus orients one or more components with respect to a location of the user.

One or more position sensors 112 may be located in association with one or more components of the personal safety apparatus. In the exemplary embodiments, position sensors 112 may be associated with each of the mast, base, jib or legs of an embodiment of the personal safety apparatus and further position sensors 112 may be associated with individual components of these structures (e.g. mast sections, first jib arm, and second jib arm). The information provided from the position sensors 112 to the controller 102 informs the controller 102 of the relative position or condition of various components of the personal safety apparatus 100 or relative status (e.g. extended or retracted).

The controller 102 uses an operation input received from the control panel 96 or remote 106 and status information from the load sensor 108, level sensor 110, or position sensor 112 to provide control signals to the various structural components of the personal safety apparatus, and more particularly, to the structures or devices that operate to move these components. The controller 102 thus uses signals to operate the mast 114, base 116, jib 118 and legs 120 as described in further detail herein. Exemplarily, the mast 114, as described above, is operated by a hydraulic assembly, and therefore, the controller 102 operates the mast by providing control signals to the hydraulic assembly to extend or collapse the mast. The base 116 is exemplarily operated with a turntable motor and a rotating assembly in order to rotate a turntable relative to the base. Therefore, the controller 102 provides control signals to the turntable motor or other rotation device to carry out rotation relative to the base 116. The jib 118 may be operated both to control a rotation angle of the jib relative to the mast as well as to control an extension of retraction of the jib arms. The controller may operate the jib accordingly by providing control signals to the devices configured to carry out these movements, exemplarily described above with respect to the operation of the hydraulic cylinders.

As will be described in further detail herein, embodiments of the personal safety apparatus 100 further includes legs 120 which may be extended to provide additional stabilization to the personal safety apparatus and may be retracted to facilitate movement of the personal safety apparatus. The controller 102 may further provide control signals to the devices configured to carry out these movements to operate the legs 120 as described in further detail herein.

In one exemplary embodiment, an operator may move the personal safety apparatus 100 into a position relative to an elevated worksite. The operator may initiate a set-up operation input into one of the control panel 96 or remote 106 and the controller 102 may operate the mast 114, jib 118 and legs 120 to move each of these components from a retracted position, exemplarily as depicted in FIG. 2 to an extended position exemplarily as depicted in FIG. 1. In embodiments, the extended position of the mast may be any position of the mast between a collapsed position and a fully extended position. In use, the extended position of the mast may exemplarily be determined by, for example, a height of the elevated worksite, or an overheard clearance at the worksite. It will be recognized that the legs are depicted in further detail with respect to FIGS. 9A and 9B. Similarly, upon completion of the work, the operator may provide a user input at the control panel 96 or remote 106 and the controller 102 operates the mast 114, jib 118 and legs 120 to move each of these components from the extended positions to the retracted positions such as to move the personal safety apparatus into the retracted configuration as exemplarily depicted in FIG. 2. In embodiments, the collapsed position of the mast may be any position of the mast between a current extended position and a fully collapsed position. In use, the collapsed position may exemplarily be determined by, for example, storage area dimensions and/or a minimum clearance height along a path that the persona safety apparatus is to be moved between or within worksites. It will be recognized that in embodiments as disclosed herein, if the base 116 has been rotated during use, then a part of an operation to move the personal safety apparatus from an extended configuration to a retracted configuration may include rotation or orientation of the base 116 to a predetermined or defined position or rotation associated with the retracted configuration.

Figure 9A:
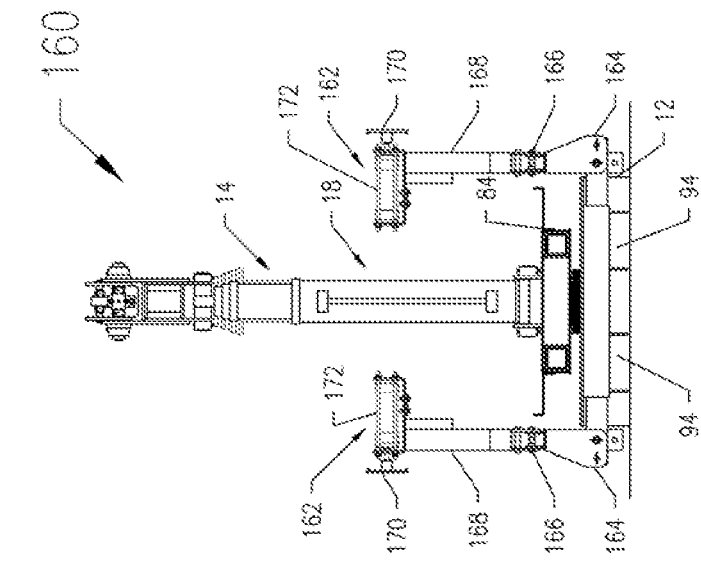
FIG. 9A is a front view of an additional exemplary embodiment of a personal safety apparatus with legs in an extended configuration.
Figure 9B:
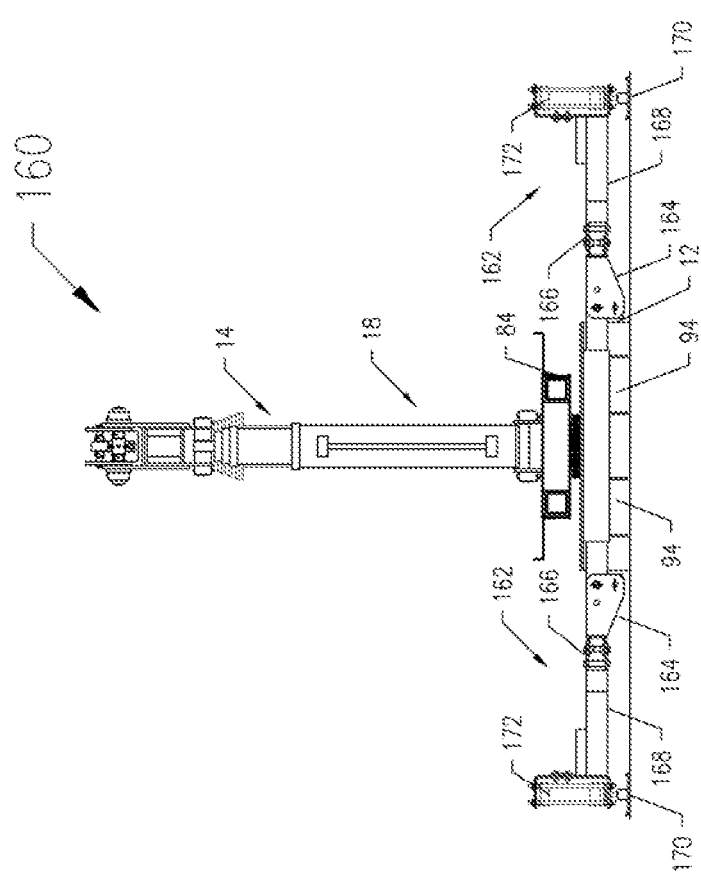
FIG. 9B is a front view of the additional exemplary embodiment of a personal safety apparatus with legs in a retracted configuration.

FIGS. 9A and 9B depict an additional exemplary embodiment of a personal safety apparatus 160 that includes a plurality of leg assemblies 162 which exemplarily can be configured to operate in the manner as described herein. It will be understood that embodiments of the leg assemblies as described here with respect to FIGS. 9A and 9B may be used in connection with any of the embodiments of the personal safety apparatus as disclosed herein. Additionally, for the purpose of conciseness, like reference numerals have been used herein to refer universally described like components from previous embodiments.

The leg assemblies 162 are exemplarily secured to the base 12 of the personal safety apparatus 160. In an exemplary embodiment, the persona safety apparatus 160 includes four leg assemblies 162, although it will be recognized that in alternative embodiments more or fewer leg assemblies 162 may be used. By reference to FIG. 11, which also depicts an exemplary embodiment of a personal safety apparatus 100 that includes leg assemblies 162, four leg assemblies 162 are used, one extends from each of four corners of the base 12. Each leg assembly 162 includes a rotation joint 164. The rotation joint 164 is operable as depicted in FIGS. 9A and 9B between and extended position as shown in FIG. 9A and a retracted position as shown in FIG. 9B. It will be recognized by a person of ordinary skill in the art that other implantations of mechanical extension and retraction, including those as described in further detail herein may be used to move the leg assemblies 162 between the retracted and extended positions. The leg assemblies 162 for exemplarily each include a pivot joint 166 about which a leg 168 is rotatable relative to the rotation joint 164. As depicted best in FIG. 11, the pivot joint 166 enables the legs 168 to be positioned at various positions relative to a respective rotation joint 164 of the leg assembly 162, as well as the base 12 of the personal safety apparatus 100. In an exemplary embodiment, the legs 168 are moveable about the pivot joint 166 by operation of the motor or hydraulics (not depicted) in the exemplary manners as described above with respect to other components in embodiments of the personal safety apparatus. In still further embodiments, the legs 168 are manually moveable about the pivot joint 166.

In embodiments, the leg 168 itself may be operable to extend and/or retract, such as with the use of hydraulic cylinders as described above with respect to other components, or through the use of electromechanical motors, exemplarily using cable and pulleys, a rack and pin, or a screw drive, although a person of ordinary skill in the art would recognize other suitable mechanical solutions to extend and/or retract the leg 168. The left assemblies 162 further include a foot 170 that extends perpendicularly to the leg 168 and is configured to engage the ground or another surface at the worksite. In embodiments, the foot 170 may be operable by a hydraulic cylinder 172 exemplarily in the manner as described above to operate the foot 170 to engage the ground or work surface to stabilize the personal safety apparatus 160.

Figure 11:
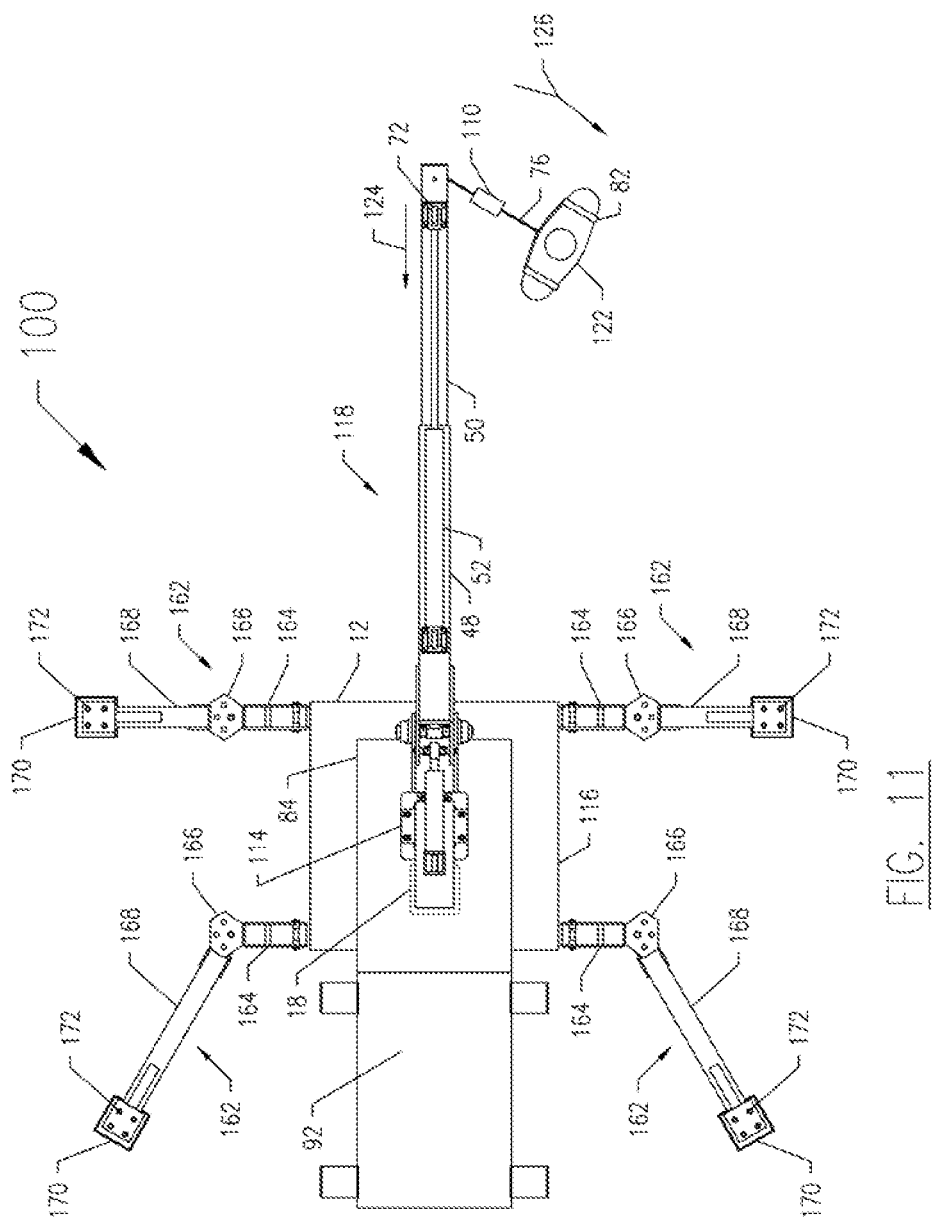
FIG. 11 is a top view of an additional exemplary embodiment of the personal safety apparatus with legs in an extended configuration.

In operation, a worker or other user of the personal safety apparatus 160 may move the personal safety apparatus to the worksite and operate the leg assemblies 162 to rotate the leg 168 about the rotation joints 164. Such rotation about the rotation joints 164 may be carried out through the use of hydraulics and/or electromechanical motors as described herein, while other embodiments may be manually operated by the user. As shown in FIG. 11, the legs 168 may then be rotated about the pivot joints 166 to locations that provide a stable engagement for the personal safety apparatus 100, 160. In still further embodiments, the positioning of the legs 168 may further be carried out with consideration to the worksite itself, exemplarily to avoid structures, material or vehicles that cannot otherwise be presently moved or avoided. In still further embodiments, the position and extension of the leg assemblies 162, including, but not limited to a rotation about the pivot joint 166 or an extension or retraction of the legs 168 may be dependent upon a size or existence of the counterweight 92.

In a still further example, as will be described in further detail with respect to the personal safety apparatus 100 as depicted in FIGS. 10 and 11 it would be recognized that additional reference numbers as used above may be incorporated into FIG. 11 and/or other figures to reference like structures previously described above for conciseness in the description.

FIG. 11 depicts a person 122 secured to the personal safety apparatus 100 by a harness 82 that the person 122 is wearing and a safety cable 76 connected between the harness 82 and the jib 118. As described above, a level sensor 110 is connected in line with safety cable 76 and produces an indication of the position of the person 122 relative to the anchor point 72 of the jib 118. As the person 122 is working at the elevated worksite, the controller 102 receives the indications from the level sensor 110 and translates these indications into control instructions to operate various components of the personal safety apparatus in order to better align the anchor point 72 on the jib 118 in a position above or vertical to the person 122. Thus, in the example depicted in FIG. 12, as the person 122 is proximal to the mast 114 from the anchor point 72, the controller 102 may operate the jib 118, and in particular the second jib arm 50 to retract in the direction of arrow 124. This operation may be carried out by a control signal to the hydraulic cylinder 52 (or a hydraulic system configured to operate hydraulic cylinder 52) to retract causing the second jib arm 50 to move in the direction of arrow 124. Additionally, as the person 122 is at a clockwise rotation from the current position of the jib 118, the controller 102 may operate the base 116, and exemplarily the rotation assembly associated with the turntable 84, to rotate the turntable 84, mast 114 and jib 118 in the direction of arrow 126. With these automated controls, the personal safety apparatus automatedly operates to maintain an optimized relationship between the anchor point 72 and the person 122. In embodiments, this may provide improved fall protection in the event of a fall by the person 122. The personal safety apparatus 100 is in an optimized position to receive the falling force or force moment produced by the person 122. Additionally, as angulation between the person 122 and the anchor point 72 is minimized, any additional forces or swinging moments placed on the suspended person in the event of a fall are also minimized. In a still further aspect, since the counter weight 92 rotates with the mast 14, embodiments of the personal safety apparatus achieve a large operable area by rotation of the mast and extension of the jib. In an exemplary embodiment, the turntable may be rotatable 360° or nearly 360° about the base, such that once the personal safety apparatus 100 is set up in a central location, the user may be able to move completely around the personal safety apparatus 100.

FIGS. 4-8 depict exemplary additional embodiments of personal safety systems and apparatus as disclosed herein. It will be recognized that in the descriptions as provided herein, like reference numerals are used for the purpose of conciseness to refer to like components previously described.

Figures 4A, 4B:
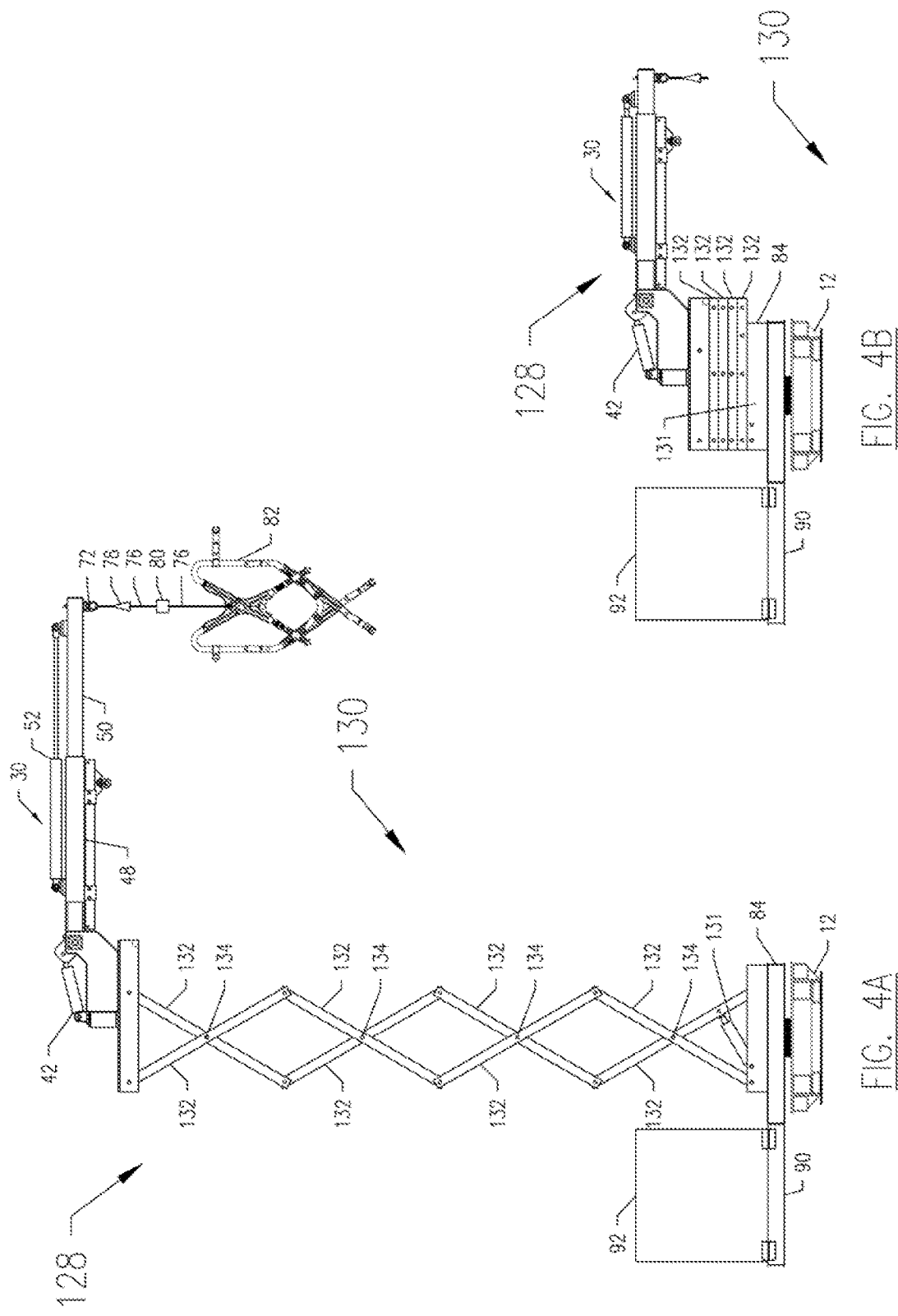
FIG. 4A depicts an exemplary alternative embodiment of a personal safety apparatus in an extended configuration.
FIG. 4B depicts an exemplary alternative embodiment of the personal safety apparatus in a retracted configuration.

FIGS. 4A and 4B depict an exemplary embodiment of a personal safety apparatus 128. The personal safety apparatus 128 includes a mast 130 that is constructed in a scissors fashion with a plurality of scissor arms 132 connected by a series of pivots 134. While not depicted, the mast 130 may be operated in a variety of manners, including, but not limited to a hydraulic assembly 131. Other embodiments may be operable by motors, pulley, and/or cable arrangements as may be used with a scissors configuration. In an exemplary embodiment, the hydraulic assembly 131 or other assembly used to operate the mast 130 may be housed in the turntable 84, as depicted in FIGS. 4A and 4B which in embodiment reduces the overall height of the personal safety apparatus 28, when operated in the retracted configuration, as exemplarily depicted in FIG. 4B.

Figure 5:
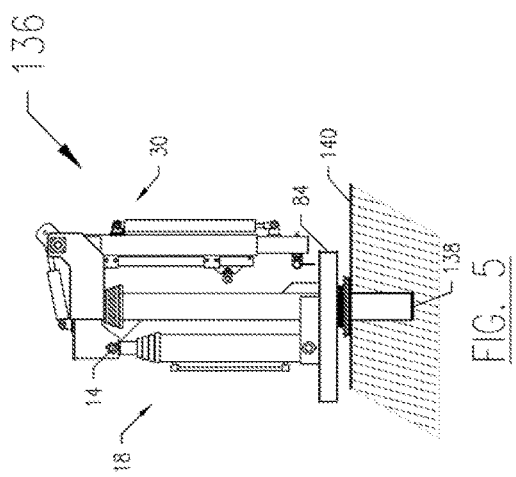
FIG. 5 depicts an exemplary alternative embodiment of a personal safety apparatus in a retracted configuration.

FIG. 5 depicts an exemplary embodiment of a personal safety apparatus 136 exemplarily in a retracted configuration. In the exemplary embodiment of the personal safety apparatus 136 depicted in FIG. 5, the base 138 is exemplarily configured to be inserted into, mounted into or fixed to the floor 140 of a worksite. Such an embodiment may be used when a personal safety apparatus 136 is often or routinely used at a specific location, requiring frequent use of the personal safety apparatus 136. In an alternative use of the embodiment of the personal safety apparatus 136, the base 138 may be fixed to the bed of a truck or to another part of a service vehicle for use in association with that vehicle or a worksite serviced by that vehicle. It will be recognized that in embodiments of the personal safety apparatus 136, the structure or object to which the base 138 is secured, an embodiment acts as the counterweight for the personal safety apparatus 136, while in use.

Figure 6:
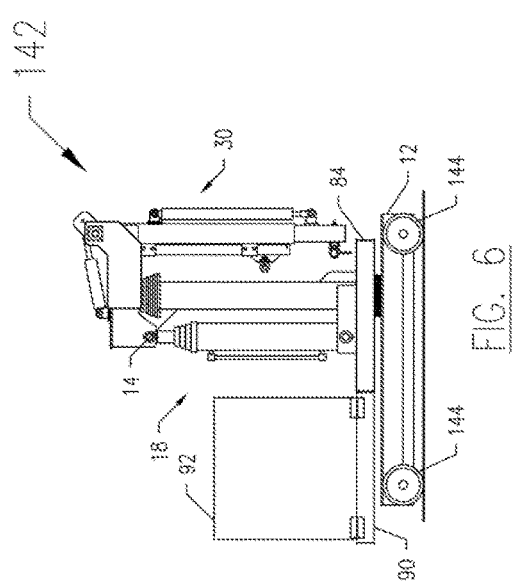
FIG. 6 depicts an exemplary alternative embodiment of a mobile personal safety apparatus in a retracted configuration.

FIG. 6 depicts a still further embodiment of a personal safety apparatus 142. The personal safety apparatus 142 exemplarily includes wheels 144 secured to the base 12 such that the personal safety apparatus 142 may move under its own power to a worksite. In an exemplary additional embodiment, the personal safety apparatus may further include a handle (not depicted) such that an operator may push or pull the personal safety apparatus to the worksite.

Figure 7:
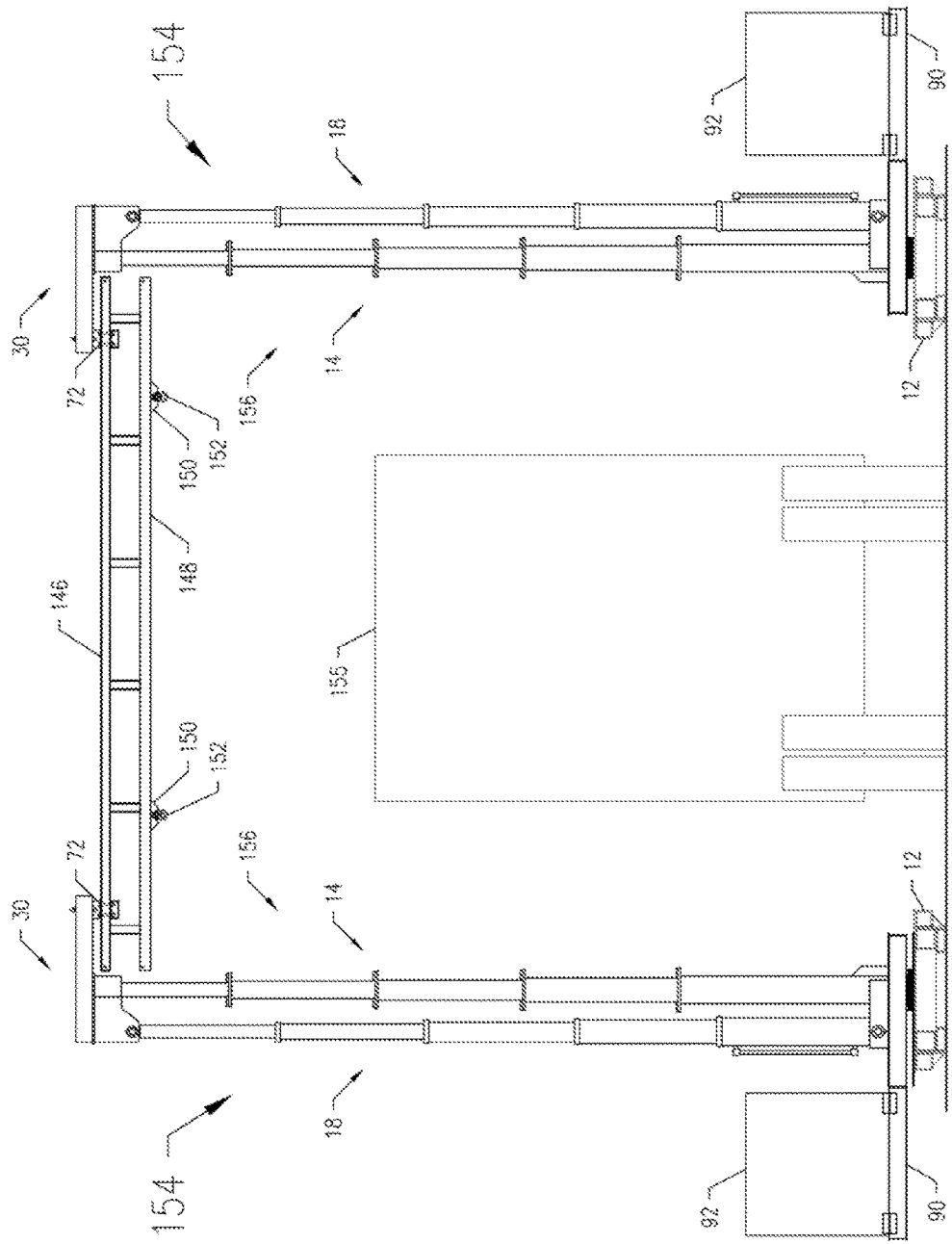
FIG. 7 depicts an exemplary alternative embodiment of a personal safety system.

FIG. 7 depicts an exemplary embodiment of a personal safety system 154 in an extended configuration. The personal safety system 154 includes two personal safety apparatus 156, as described in detail herein. A truss 146 is suspended between the attachment points 72 of the personal safety apparatus 156. At least one track 148 is associated with or connected to the truss 146. One or more trolleys 150 are engaged with the track 148. Each trolley 150 includes an anchor point 152 to which a person is connected with a safety cable (not depicted). In an embodiment, the personal safety system 154 may be configured about an elevated worksite 155, which may exemplarily be a truck of a trailer.

Figure 8:
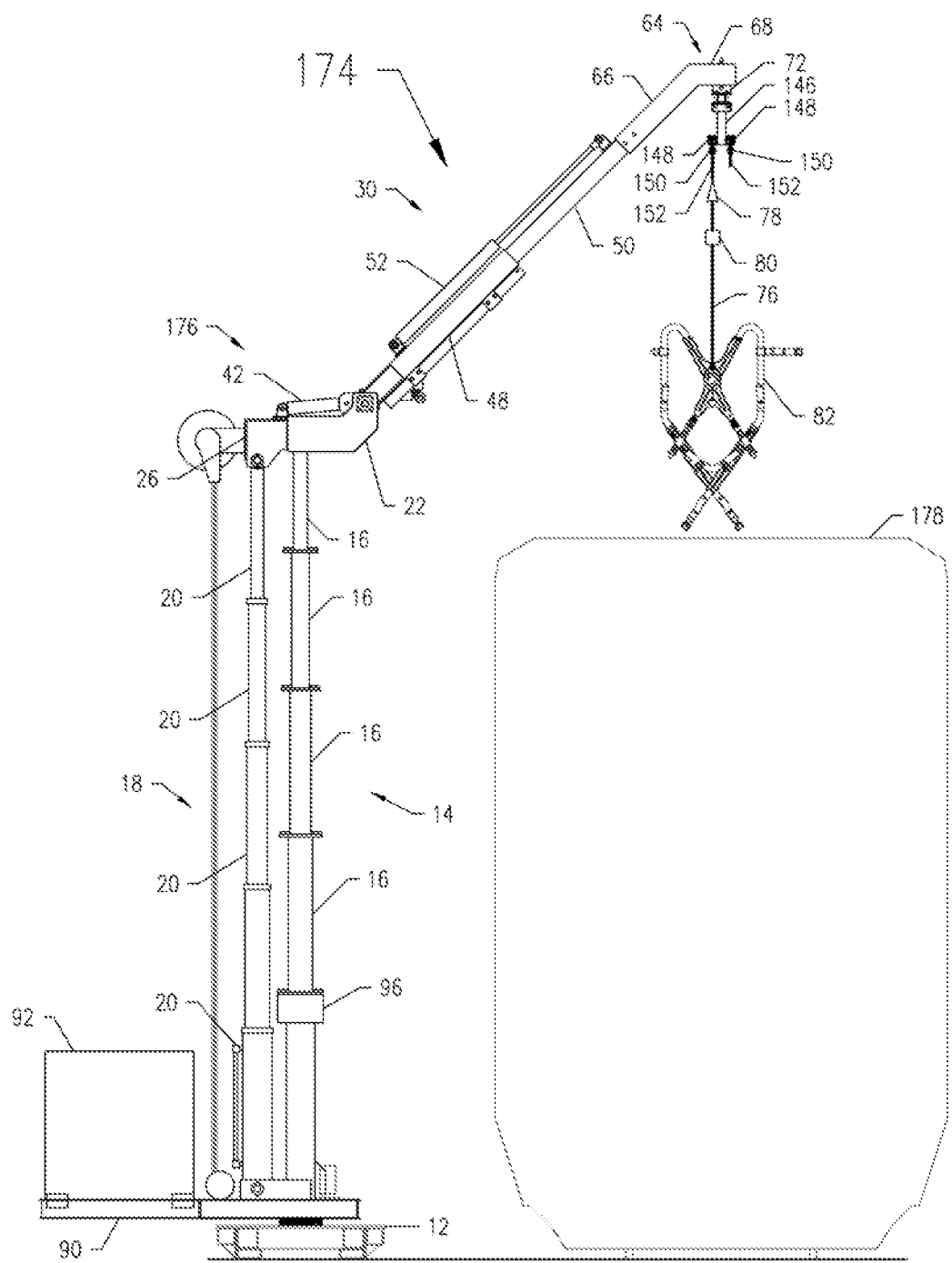
FIG. 8 depicts a further exemplary alternative embodiment of a personal safety system.

FIG. 8 depicts a still further exemplary embodiment of a personal safety system 174 in an extended configuration. The personal safety system 174 is depicted as a side view in FIG. 8, and it is recognized that two or more personal safety apparatus 176 are arranged in alignment relative to an elevated worksite 178. In an embodiment of the personal safety system 174, the elevated worksite 178 is exemplarily a train or train car. In a still further exemplary embodiment, the elevated worksite 178 is elongated and the dimension along which the personal safety apparatus 176 are aligned. Similar to the exemplary embodiment described above with respect to FIG. 7, a truss 146 is suspended between attachment points 170 on the extension arm 64 of the jib 30 of the personal safety apparatus 176. Therefore, the truss 146, which includes at least one track 148, trolley 150, and anchor point 152 to which the safety line 76 is secured to be secured to a worker wearing a harness 82. The exemplary alignment of the truss 146 along the elongated dimension of the elevated worksite 178 facilitates providing fall protection to the worker working along the entirety for, at least an elongated portion, of the elevated worksite 178. In embodiments of the personal safety system 174, it will be recognized that the control and adjustment of the mast and jib, and other components of the personal safety apparatus 176 facilities and enable the flexible arrangement of the personal safety system 174 to be specifically arranged about the elevated worksite 178 while being easily modifiable or moveable should the need arise.

FIG. 12 depicts another exemplary embodiment of a personal safety apparatus 180 in a retracted configuration. In the exemplary embodiment of the personal safety apparatus 180, a plurality of like assemblies 182 are secured to the base 12 and are extendable with respect to the base 12. In the embodiment of the personal safety apparatus 180, the leg assemblies 182 may asymmetrically extend from the base 12 such that one leg assembly 182 may extend underneath a portion of an elevated worksite 155, exemplarily a truck or truck trailer. In an exemplary embodiment, the leg assembly 182 includes a leg 184 that is extendable or retractable relative to the base 12. A foot 186 is secured to the end of the leg 184. In an embodiment, a hydraulic cylinder 188 operates to extend the foot 186 in a direction toward the ground to engage the ground to stabilize the personal safety apparatus 180.

In the exemplary embodiment depicted in FIG. 12, the mast 14 may be extended to the extended position after the leg assemblies are arranged as depicted relative to the elevated worksite 155. After extension of the mast 14, the jib 30 may be rotated and extended out over the elevated worksite 155 and used by a worker for fall protection when working atop the elevated worksite 155. Due to the cantilevered effect produced by the one or more leg assemblies 182 that extend underneath the elevated worksite 155, and generally about the area in which the worker is working at the elevated worksite, an embodiment of the personal safety apparatus 180 may operate without the need for a physical counterweight as the cantilever leg assembly 182 provide the function of the counterweight.

In exemplary embodiments as disclosed herein may achieve advantages in certain configurations and applications in that an embodiment may be compactly stored and moved to a particular worksite when needed. The fall protection provided by exemplary embodiments of the personal safety apparatus is provided in a manner that is independent of the strength of any particular structure at the worksite or the worksite itself. Additionally, automated adjustment features found in embodiments maintain and optimize a relationship between the functional components of the personal safety apparatus and the user. In still further embodiments, the personal safety apparatus as disclosed herein may be leveraged as a personal hoist or crane that can be used at worksites that do not require fall protection. In such embodiments, a spool or reel of cable threaded through an anchor point or another specialized attachment point can leverage the use of embodiments for purposes other than personal fall protection. In some of such embodiments, the personal safety apparatus as disclosed herein may simultaneously provide personal fall protection and material handling capabilities through the simultaneous use of multiple anchor points.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A personal safety apparatus, comprising:
   a base;
   a mast connected to the base, the mast comprising a plurality of mast sections and being vertically extendable from the base between a collapsed position and an extended position;
   a jib rotatably connected to the mast and movable between a first position wherein the jib is generally parallel to the mast and a second position wherein the jib extends outward from the mast, the jib further comprising a first jib arm and a second jib arm, the second jib arm movably engaged with the first jib arm, wherein the second jib arm is movable relative to the first jib arm between a first retracted position and a second extended position;
   an anchor point secured to the jib, the anchor point configured to connect a cable to the personal safety apparatus.

2. The personal safety apparatus of claim 1, further comprising:
   a controller operably connected to the mast, and the jib, the controller operates the personal safety apparatus between a first configuration and a second configuration;
   wherein in the first configuration, the mast is in the collapsed position, the jib is in the first position, and the second jib arm is in the first retracted position; and
   wherein in the second configuration, the mast is in the extended position, the jib is in the second position, and the second jib arm is in the second extended position.

3. The personal safety apparatus of claim 2, further comprising:
   a plurality of legs secured to the base;
   wherein the controller is further operably connected to the plurality of legs and the controller further operates the plurality of legs between extended positions and retracted positions, before the controller operates the personal safety apparatus between the first configuration and the second configuration.

4. The personal safety apparatus of claim 1, further comprising at least one counterweight arm extending generally horizontally from the base in a direction generally opposite the jib, the at least one counterweight arm configured to receive a counterweight.

5. The personal safety apparatus of claim 1, further comprising a motor operatively connected to the mast and the jib, wherein operation of the motor moves the mast between the collapsed position and the extended position and moves the jib between the first position and the second position.

6. The personal safety apparatus of claim 1, further comprising at least one cable and at least one pulley operatively connected to the mast and the jib, wherein operation of the at least one pulley and the at least one cable moves the mast between the collapsed position and the extended position and moves the jib between the first position and the second position.

7. The personal safety apparatus of claim 1, wherein the plurality of mast sections comprise a plurality of telescopically arranged tubular mast sections.

8. The personal safety apparatus of claim 1, wherein the plurality of mast sections comprise a plurality of adjacently oriented rods.

9. The personal safety apparatus of claim 1, wherein the base comprises one or more ports configured to receive a functional arm of a conveying apparatus.

10. The personal safety apparatus of claim 1, further comprising
    a second anchor point connected to the jib.

11. The personal safety apparatus of claim 10, further comprising a winch secured to the personal safety apparatus.

12. The personal safety apparatus of claim 11, wherein the winch is secured to the second anchor point.

13. The personal safety apparatus of claim 10, further comprising:
    a track secured to the jib;
    a trolley movably connected to the track, the trolley comprising at least one of the first anchor point and the second anchor point, wherein the trolley is movable along the track.

14. The personal safety apparatus of claim 10, further comprising:
    a mechanical retractor secured to the mast; and
    a safety cable secured to the mechanical retractor at a first end and configured at a second end to secure to a safety harness, the safety cable extends through the first anchor point.

15. A personal safety system comprising:
    first and second personal safety apparatus, each of the first and second personal safety apparatus comprising:
    a base;
    a mast connected to the base, the mast comprising a plurality of mast sections and being vertically extendable from the base between a collapsed position and an extended position;
    a jib rotatably connected to the mast and movable between a first position wherein the jib is generally parallel to the mast and a second position wherein the jib extends outward from the mast; and
    an anchor point, the anchor point configured to connect to a cable configured to secure to a person;
    wherein the first and second personal safety apparatus are arranged relative to each other and are generally operated such that each mast is in the collapsed position or the extended position and each jib is in the first position or the second position; and
    wherein the first and second personal safety apparatus are configured to support a safety cable therefrom.

16. The personal safety system of claim 15, further comprising:
    a beam secured between the jib of the first personal safety apparatus and the jib of the second personal safety apparatus; and
    the safety cable movably secured to the beam.

17. The personal safety system of claim 16 wherein the jib further comprises a first jib arm and a second jib arm telescopically connected to the first jib arm, wherein the second jib arm is movable relative to the first jib arm between a retracted position and an extended position and the beam is secured to the second jib arms of the first and second personal safety apparatus.

18. The personal safety system of claim 16, further comprising:
    a trolley and the cable secured to the trolley, wherein the beam comprises a track and the trolley is movable along the track.

19. The personal safety system of claim 16, wherein the beam is secured to the first and second personal safety apparatus in a configuration parallel to the jibs of the first and second personal safety apparatus.

20. The personal safety system of claim 16, wherein the beam is secured to the first and second personal safety apparatus in a configuration perpendicular to the jib of the first personal safety apparatus and the jib of the second personal safety apparatus.

\* \* \* \* \*